United States Patent [19]

Kondo

[11] Patent Number: 4,878,564
[45] Date of Patent: Nov. 7, 1989

[54] DISC BRAKE ASSEMBLY
[75] Inventor: Toshio Kondo, Okazaki, Japan
[73] Assignee: Aisin Seiki Kabushiki Kaisha, Kariya, Japan
[21] Appl. No.: 225,203
[22] Filed: Jul. 28, 1988
[30] Foreign Application Priority Data Jul. 29, 1987 [JP] Japan ................................. 62-115019

[51] Int. Cl.[4] ............................................. F16D 55/224
[52] U.S. Cl. ............................... 188/73.31; 188/73.32; 188/73.45; 188/73.47
[58] Field of Search ............. 188/72.4, 73.31, 73.32, 188/73.36, 73.37, 73.44, 73.45, 73.47, 72.5, 73.43

[56] References Cited

U.S. PATENT DOCUMENTS

| | | | |
|---|---|---|---|
| 3,256,959 | 6/1966 | Eggstein | 188/73.32 |
| 3,768,604 | 10/1973 | Falk | 188/72.4 X |
| 3,920,104 | 11/1975 | Hoffmann | 188/73.31 |
| 3,997,034 | 12/1976 | Kellogg | 188/73.45 |
| 4,174,769 | 11/1979 | Gerard | 188/73.32 |

FOREIGN PATENT DOCUMENTS 2326620 4/1977 France ................................. 188/73.45
2161559 1/1986 United Kingdom ............ 188/73.45

Primary Examiner—George E. A. Halvosa
Attorney, Agent, or Firm—Burns, Doane, Swecker & Mathis

[57] ABSTRACT

A disc brake assembly includes a brake disc rotated with a wheel in a body, a pair of brake pads disposed on opposite sides of the brake disc so as to nip the brake disc and a caliper member straddling a portion of the brake disc and having a bridge portion straddling outer circumferences of the brake pads and the brake disc. The caliper member is provided with a pair of arm portions formed in approximately U-shape and straddling the outer circumference of the brake disc adjacent leading and trailing sides of the bridge portion with respect to the direction of rotation of the brake disc. The brake pads are provided with a pair of ear portions extended outwardly at opposite sides of the outer periphery thereof so as to locate the bridge portion therebetween, respectively. The ear portions are slidably supported on the arm portions in the axial direction of the brake disc and the trailing ear portions transmit the brake torque acting on the brake pads to the trailing side surface of the bridge portion.

16 Claims, 3 Drawing Sheets

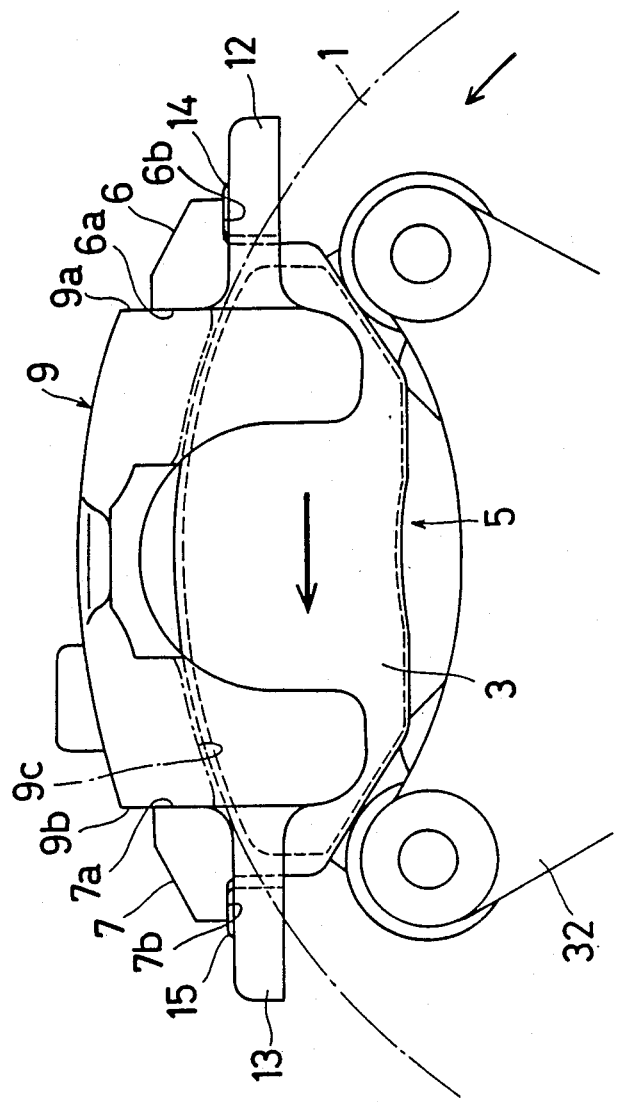

DISC BRAKE ASSEMBLY

BACKGROUND OF THE INVENTION

1. Field of the Invention

The present invention relates to a disc brake assembly for wheeled vehicles, and more particularly to a disc brake assembly which decreases weight of the assembly without decreasing the hardness of the caliper member and which decreases generation of brake equal.

2. Description of the Prior Art

In a disk brake, it is known that an unpleasant noise, termed squeal, is sometimes generated when the disc brake is applied. It is thought that the squeal is caused by minute vibrations of the brake pads which are generated by friction forces when the brake pads are pressed against the rotating brake disc.

On both sides of the brake pad, the direction of rotation of the disc defines the leading side and the trailing side. The leading side of the brake pads is with reference to the direction of rotation of the disc as it passes through the caliper and brake pad assembly and is the forwardmost location, viewed in the direction of disc rotation, of the brake pad assembly. Conversely, the trailing side is the rearmost location, viewed in the direction of disc rotation, of the brake pad assembly.

Brake torque is created when the brake pads are applied to the disc. In the prior art, this brake torque is transmitted to the end portion of the leading side of each brake pad. Namely, the end portion of the leading side of each brake pad contacts a fixed member and the brake torque is transmitted to the fixed member at the leading side. The conventional disc brake assembly of this kind is disclosed, for example, in Japanese application publication No. 50-7701 published on Mar. 28, 1975, or in Japanese application laid-open publication No. 55-47022 published without examination on Apr. 2, 1980. In each disc brake, the brake torque is transmitted at the leading side.

In the conventional disc brake assembly, however, since the brake torque is transmitted at the leading side, a reaction force is generated in the fixed member against the pressing force of the brake pad of the leading side. As a result, the reaction force and the friction force between each brake pad and the disc generates a force moment in the brake pad. This moment generates partial abrasion in the brake pad, thereby generating brake squeal.

Further, in the disc brake, if the hardness of the caliper member is low, the flexure of the caliper member is large. As a result, the consumption of brake fluid increase and pedal feel during brake operation deteriorates. This problem may be overcome by increasing the thickness of the caliper member, however, the weight of the disc brake will increase.

SUMMARY OF THE INVENTION

It is, therefore, an object of the present invention to prevent or reduce the generation of brake squeal when the disc brake is applied.

It is another object of the present invention to reduce the generation of the partial abrasion of the brake pad.

It is a further object of the present invention to reduce the manufacturing cost of the disc brake assembly.

It is a further object of the present invention to provide an improved disc brake assembly which includes a brake disc rotatable with a wheel in a body, a pair of brake pads positioned on either side of the faces of the brake disc so as to nip the brake disc therebetween, a caliper member straddling a portion of the brake disc and having a bridge portion straddling an outer circumference of the brake pads and the brake disc. The caliper member has a pair of arm portions formed in approximately U-shape and which straddles the outer circumference of the brake disc at both sides of the bridge portion. The brake pads have a pair of ear portions extending outwardly at both sides of the outer periphery thereof so as to locate the bridge portion therebetween, respectively. The ear portions are slidably supported on the arm portions in the axial direction of the brake disc and transmit the brake torque generated at the brake pads on the side surface of the bridge portion at the trailing sides thereof, respectively.

In the prior art, the brake torque is transmitted to the fixed member at the leading side. Namely, the backing plate 52 secured to the bradk pad 51 is contacted with the fixed member 53 at the leading side as shown by FIG. 5. In this arrangement, the reaction force Fr is transmitted to the backing plate, and a moment is generated between the friction force Ff with respect to the backing plate and the supporting point S of the fixed member with respect to the backing member. The moment is transmitted to the brake pads so as to roll the brake pads in the brake disc and distribution of the surface pressure of the brake pads with respect to the brake disc is not equalized between the trailing side and the leading side. Namely, the surface pressure of the trailing side is large and the surface pressure of the leading side is small. As a result, abrasion of the brake pads of the trailing side increases and uneven wear is generated in the brake pads. Further, minute vibrations are generated in the brake pads and squeal is generated.

In the present invention, the brake torque is transmitted to a bridge portion of the caliper member along ear portions of the trailing side. The reaction force is transmitted between the side surface of the bridge portion and the end portion of the ear portions but the reaction force is transmitted to the trailing side. Therefore, the moment is not transmitted to the brake pads so as to roll the brake pads in the brake pads. Accordingly, it is able to restrain the partial abrasion of the brake pads.

BRIEF DESCRIPTION OF THE DRAWINGS

Additional objects and advantages of the present invention will become more apparent from the following detailed description of preferred embodiments thereof when considered with reference to the attached drawings, in which:

FIG. 2 is an elevation view of a disc brake assembly in accordance with the present invention;

DESCRIPTION OF THE PREFERRED EMBODIMENTS

Figure 1:
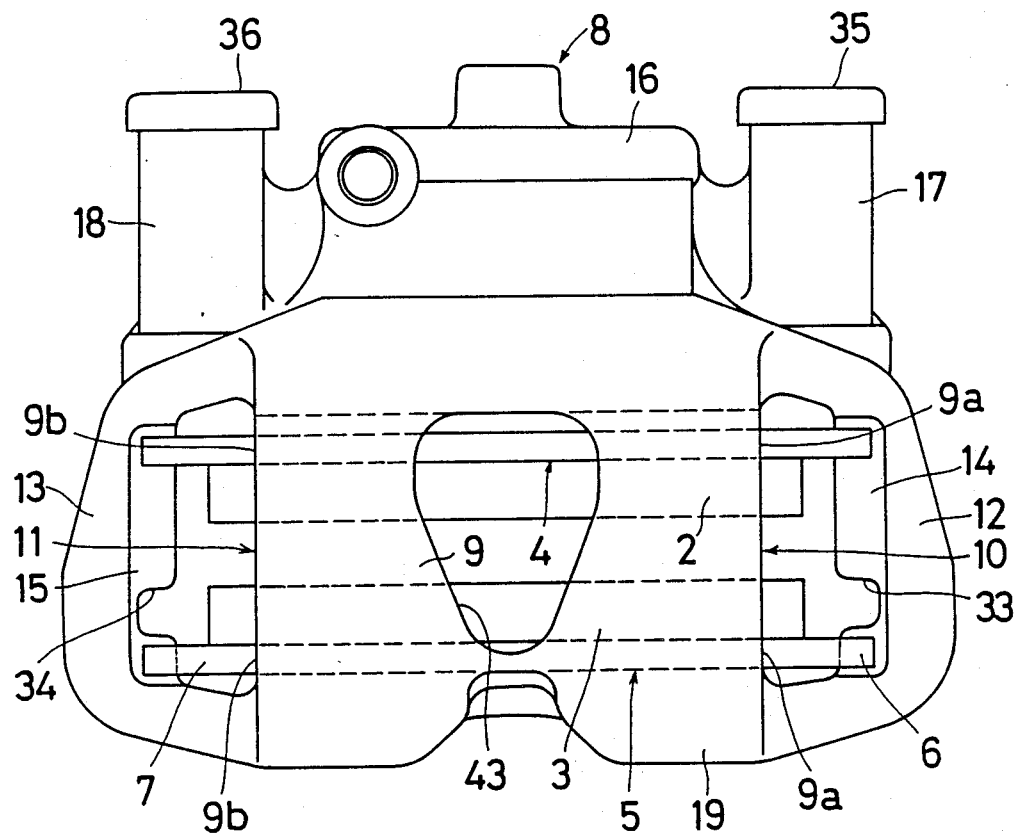
FIG. 1 is a plan view partly in section of a disc brake assembly in accordance with the present invention.
Figure 5:
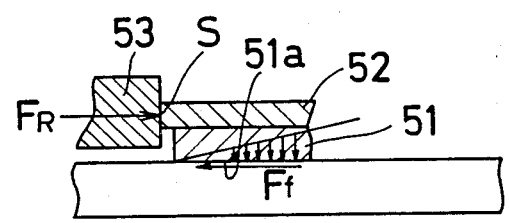
FIG. 5 is an outline diagram of the braking mechanism of the prior art.

A disc brake assembly constituted in accordance with a preferred embodiment of the present invention will be described with reference to the drawings.

In FIG. 1–FIG. 4 of the appended drawings, there is illustrated a disc brake assembly of the pin slide type which includes a brake disc 1 connected or secured for rotation with a road wheel of an automotive vehicle. A mounting member 32 is fixed to a stationary member of a body structure of the vehicle such as a knuckle member (not shown) at the inside of the brake disc 1. A caliper member 8 straddles a portion of the brake disc 1. Parallel guide pins 30, 37 are fixed to the mounting member 32 to support thereon the caliper member 8. An inner brake pad 2 is carried on the caliper member 8 at an inside portion of the brake disc 1, and an outer brake pad 3 is carried on the caliper member 8 at an outside portion of the brake member 8.

The caliper disc 1 is provided with two pin portions 17, 18 at the side of the cylinder portion 16. Pin holes 31, 38 are shut off or sealed in a liquid-tight manner by the caps 35, 36.

The pin 30 has a cylindrical shape. A support member 27 is fitted on the base portion 30a of the pin 30 and the base portion 30a is fixed to the mounting member 32 by a threadable engagement therewith. A pin boot 26 is postioned at a opening portion of the pin hole 31 around the base portion 30a of the pin 30. The pin boot 26 is provided with one end portion which is sealingly fitted into a groove 42 formed on the inner surface of the pin hole 31 and is provided with the other end portion which is sealingly fitted into an outer groove 29 of the support member 27. The pin 27 is also fixed to the mounting member 32 by the same structure as the pin 30. The pins 30, 37 are fitted in the pin holes 31 and 38 and the caliper member 8 is slidably supported on the pins 30, 37.

The caliper member 8 is provided with the cylinder portion 16, a bridge portion 9 and a reaction portion 19. The bridge portion 9 straddles the brake disc 1 and both brake pads 2, 3. The inner brake pad 2 is secured to a backing plate 4 and the backing plate 4 is slidably supported on surfaces 14, 15 of arm portions (discussed below) of the caliper member 8. The outer brake pad 3 is secured to a backing plate 5 and the backing plate 5 is slidably supported on surfaces 14, 15 of the caliper member 8 in the same manner as the inner pad 2. The brake disc 1 is interposed between both brake pads 2, 3. Both brake pads 2, 3 are able to press against both sides of the brake disc 1, and the rotation of the brake disc 1 is stopped by the friction force between the brake disc 1 and both brake pads 2, 3.

Figure 3:
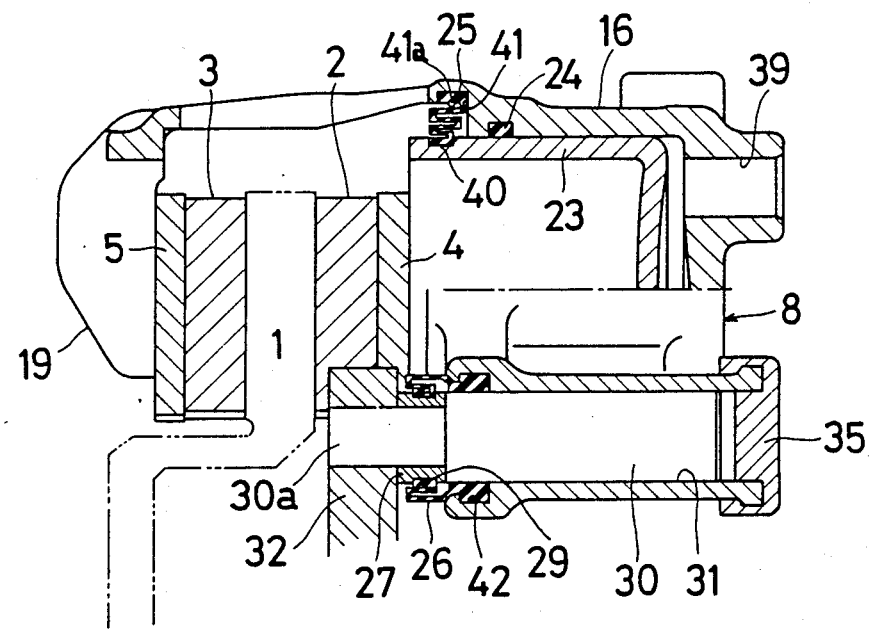
FIG. 3 is a sectional view of a disc brake assembly in accordance with the present invention.
Figure 4:
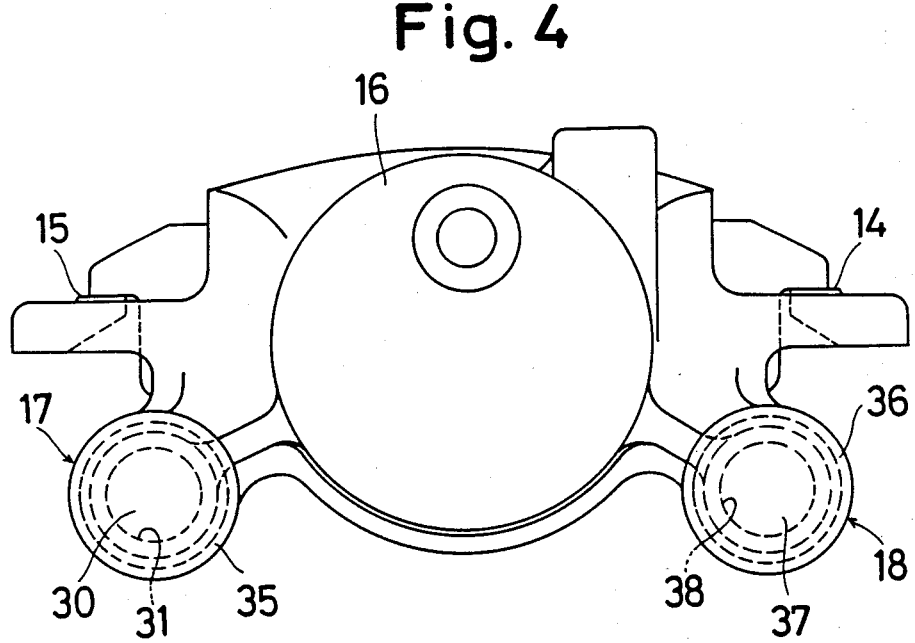
FIG. 4 is a back side view of a disc brake assembly in accordance with the present invention.

A piston 23 is slidably received in the cylinder portion 16 of the caliper member 8. The piston 23, as shown in FIG. 3, is slidably moved to the left by operational fluid pressure applied from inlet port 39 and presses against the backing plate 4. Numeral 24 denotes a seal member and numeral 25 denotes a dust boot. The dust boot 25 is provided with one end portion fitted into an outer groove 40 of the piston 23 and is provided with the other end portion which is fitted into an inner groove 41 of the cylinder portion 16. The other end of the dust boot 25 is urged or biased in an outer radial direction by a spring 41a to provide an effective sealing arrangement between the cylinder portion 16 and the piston 23.

The arm portions 12, 13 are of substantially U-shape and are integrally formed to the side surfaces 10, 11 of the caliper member 8. The arm portions 12, 13 are provided with the one end connected to a side face of the cylinder portion 16. Further, the arm portions 12, 13 are provided with the other end which is connected to a side face of the reaction portion 19. According to this structure, the force transmitted to the bridge portion 9 of the caliper member 8 in the vertical direction is supported by the cylinder portion 16, the bridge portion 9 and the reaction portion 19 which have an increased hardness (resistance to mechanical deformation since the overall strength is increased) by the connection via the arm portions 12, 13. Further, the force transmitted to the reaction portion 19 and the cylinder portion 16 in the horizontal direction is supported on the cylinder portion 16, the arm portions 12, 13 and the reaction portion 19.

The backing plate 5 of the outer brake pad is approximately in sector shape and includes a pair of ear portions 6, 7 at the both sides of the outer periphery of the plate. The ear portions 6, 7 extend outwardly and the side surfaces 6a, 7a of the ear portions 6, 7 are contactable with the side surfaces 9a, 9b of the bridge portion 9. The bridge portion 9 of the caliper member 8 is located between the ear portions 6, 7 and the lower surfaces 6b, 7b of the ear portions 6, 7 are in contact with the sliding surfaces 14, 15. The outer circumferential surface of the backing plate 5 is contactable with the inner circumferential surface 9c of the bridge portion 9. The backing plate 5 is slidably supported on the arm portions 12, 13 by the ear portions 6, 7 in the axial direction of the piston 23. Further, the backing plate 5 supports the brake torque applied to the brake pad 3 at the trailing side of it. The backing plate 4 of the inner brake pad 2 is also arranged in the same manner as the backing plate 5.

The sliding surfaces 14, 15 of the arm portions 12, 13 are provided with concave sections 33, 34 so as to facilitate installation and detachment of the brake pads 2, 3.

Further, the opening portion 43 is provided in the upper wall of the bridge portion 9. The opening portion 43 permits the introduction of air to both pads so as to facilitate heat transfer and, thus, cooling of the pads during the vehicle's running condition.

When the brake master cylinder (not shown) is operated, the operational fluid pressure is applied from the master cylinder to the inlet port 39. As shown in FIG. 3, the operational fluid pressure applied to the inlet port 39 presses the backing plate 4 to the left by actuating the piston 23. As a result, the inner brake pad 2 is pressed against the brake disc 1 and the caliper member 8 slides to the right on the pins 30, 37 by the reaction force of the operational fluid pressure in the cylinder portion 16. Accordingly, the backing plate 5 is then pressed to the right by the reaction portion 19 of the caliper member 8. The brake disc 1 is nipped or contacted by both brake pads 2, 3 and the rotation of the brake disc 1 is stopped by the friction force between the brake pads 2, 3 and the brake disc 1.

Both brake pads 2, 3 rotate with the brake disc 1 upon the application of the brake torque in the direction of the arrow in FIG. 2. The torque developed by the braking action is transmitted to the bridge portion 9 and the arm portions 12, 13 through the ear portions 6 of the backing plates 4, 5 at the trailing side, respectively. That is, in FIGS. 1 and 2, the force which is developed by leftward operation of the brake pads 2, 3 is transmitted to the side surface 9a of the trailing side of the bridge portion 9. Further, the downwardly directed moments of force developed by brake pads 2, 3 is transmitted to the sliding surfaces 14, 15 and the upwardly developed moments of force developed by brake pads 2, 3 is transmitted to the inner circumferential surface 9c of the bridge portion 9. These forces are transmitted to the pin portions 17, 18 through the caliper member 8 and finally transmitted to the mounting member 32.

Further, since the contact point between each ear portion 6, 7 and the bridge portion 9 is offset with respect to the center of the pressing area of each brake pad 2, 3 in FIG. 2, a clockwise moment around the contact point between each ear portion 6, 7 and the bridge portion 9 is generated in each brake pad 2, 3. As a result, the outer circumferential surface of the backing plates 4, 5 of the leading side is in contact with the inner circumferential surface 9c of the bridge portion 9 and the lower surface 6b of the ear portion 6 is pressed against the sliding surface 14. Accordingly, the brake pads 2, 3 will not produce any substantial vibration in the radial direction of the brake disc 1. Therefore, the structure of the present invention is able to prevent or substantially reduce the generation of squeal.

When the disc brake is operated, a force in the horizontal direction is applied so as to press the reaction portion 19 away from the cylinder portion 16. Flexure of the caliper member 8, in response to this force, is restrained by the arm portions 12, 13. Further, the vertical force is transmitted from the backing plates 4, 5 to the bridge portion 9 through the inner circumferential surface 9c. Flexure of the caliper member 8, in response to vertical force, is also restrained by the arm portions 12, 13.

In the present invention, torque produced by action of the brake is transmitted to the side surface of the bridge portion of the caliper member at the ear portion of the trailing side of the backing plate. Accordingly, a reaction force, in response to the pressing force generated in the ear portion, is generated in the trailing side and is not generated in the leading side. As a result, the force moment transmitted to the brake pads by the reaction force of the ear portion and the friction force between the brake disc and the brake pads is not further transmitted. Therefore, the generation of the squeal is substantially prevented and partial abrasion of the brake pads may be restrained.

Further, in the present invention, the hardness or strength of the caliper member may be increased without increasing the weight of the disc brake assembly. As a result, the opening portion in the bridge of the caliper is able to be enlarged for increasing the cooling rate of the brake pads.

Further, the arm portions function as the supporting portion of the brake pads and as the strength portion of the caliper member. As the arm portions form an opening at both side portions of the caliper, additional cooling air is provided for cooling the brake pads.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A disc brake assembly comprising:
   a brake disc rotated with a wheel of a body for rotation about an axis extending in an axial direction;
   a pair of brake pads disposed with the brake disc therebetween so as to squeeze the brake disc;
   a caliper member straddling a portion of the brake disc and having a cylinder portion and a reaction portion on opposite sides of the brake disc, respectively, the caliper member further including a bridge portion straddling outer circumference of the brake pads and the brake disc and connecting the cylinder portion of the reaction portion;
   said caliper member having a pair of arm portions formed integrally therewith, extending between the cylinder portion and the reaction portion, and being circumferentially spaced from the bridge portion with respect to the direction of rotation of the brake disc, each of the arm portions having an approximately U-shape and straddling the outer circumference of the brake disc adjacent a respective one of leading and trailing sides of the bridge portion with respect to a direction of rotation of the brake disc;
   each of the brake pads having a pair of ear portions extending outwardly from opposite sides of the outer periphery thereof so as to locate the bridge portion therebetween; and
   said ear portions being slidably supported on the arm portions for movement in the axial direction of the brake disc and said ear portions on the trailing side of the bridge portion being capable of transmitting brake torque generated at the brake pads to the trailing side surface of the bridge portion.

2. A disc brake assembly as recited in claim 1, wherein the caliper member is slidably mounted on pins extending from a mounting member, and the cylinder portion includes a piston for pressing one of the brake pads against one face of the brake disc and the reaction portion presses another of the brake pads against the other face of the brake disc.

3. A disc brake assembly as recited in claim 2, wherein supporting points between the ear portions of each of the brake pads and the bridge portion are offset with respect to a center of a pressing area of a respective one of the brake pads, outer circumferences of the leading sides of the brake pads are contacted with an inner circumference surface of the bridge portion by a moment acting on the brake pads when the disc brake is operated and the ear portions of trailing sides of the brake pads are pressed against the arm portion adjacent the trailing side of the bridge portion by the moment generated when the disc brake is operated.

4. A disc brake assembly as recited in claim 2, wherein each of the arm portions is provided with a concave portion sized for passing a respective one of the ear portions of the brake pads therethrough.

5. A disc brake assembly as recited in claim 1, wherein the ear portions of each of the brake pads include engaging portions which extend in opposite directions away from each other, each of the engaging portions having a surface slidably mounted on a respective surface of one of the arm portions.

6. A disc brake assembly as recited in claim 5, wherein each of the ear portions includes a surface engageable with a respective one of the leading and trailing sides of the bridge portion.

7. A disc brake assembly as recited in claim 6, wherein each of the brake pads includes a radially outer surface with respect to the axial direction, the radially outer surface being engageable with a radially inner surface of the bridge portion.

8. A disc brake assembly as recited in claim 1, wherein the bridge portion includes means for air cooling the brake disc, said means comprising an opening in said bridge portion.

9. A disc brake assembly as recited in claim 1, wherein the pair of arm portions are separated from and are unconnected to the bridge portion except through the cylinder portion and the reaction portion, respectively.

10. A disc brake assembly comprising:
a brake disc rotably mounted for rotation about an axis extending in an axial direction;
a pair of brake pads movably mounted with the brake disc therebetween;
a caliper member supporting the brake pads, the caliper member including a reaction portion on one side of the brake disc and a cylinder portion on the other side of the brake disc, the caliper member further including a bridge portion and a pair of U-shaped arm portions extending between the cylinder portion and the reaction portion, the arm portions being located on leading and trailing sides of the bridge portion with respect to a direction of rotation of the brake disc, the arm portions being circumferentially spaced from the bridge portion with respect to the direction of rotation of the brake disc;
each of the brake pads including a pair of ear portions supported by the arm portions of the caliper member, the ear portions on the trailing side of the bridge portion including respective surfaces which are supported by the trailing side of the bridge portion when brake torque is generated at the brake pads.

11. A disc brake assembly as recited in claim 10, wherein the ear portions of each of the brake pads include engaging portions which extend in opposite directions away from each other, each of the engaging portions having a surface slidably mounted on a respective surface of one of the arm portions.

12. A disc brake assembly as recited in claim 11, wherein each of the ear portions on the leading side of the bridge portion includes a surface engageable with the leading side of the bridge portion.

13. A disc brake assembly as recited in claim 12, wherein each of the brake pads includes a radially outer surface with respect to the axial direction, the radially outer surface being engageable with a radially inner surface of the bridge portion.

14. A disc brake assembly as recited in claim 10, wherein the bridge portion includes means for air cooling the brake disc, said means comprising an opening in said bridge portion.

15. A disc brake assembly as recited in claim 10, wherein the pair of arm portions are integral with the cylinder portion and the reaction portion.

16. A disc brake assembly as recited in claim 10, further comprising a mounting member, said caliper member being slidably supported by the mounting member for movement in the axial direction.

* * * * *